United States Patent [19]

Famili et al.

[11] Patent Number: 5,028,648
[45] Date of Patent: Jul. 2, 1991

[54] EXTRUDABLE POLYVINYL ALCOHOL COMPOSITIONS CONTAINING THERMOPLASTIC POLYURETHANE

[75] Inventors: Amir Famili, Schnecksville; Finn L. Marten, Macungie; James F. Nangeroni, Allentown, all of Pa.

[73] Assignee: Air Products and Chemicals, Inc., Allentown, Pa.

[21] Appl. No.: 551,350

[22] Filed: Jul. 12, 1990

[51] Int. Cl.$^5$ .............................................. C08L 75/04
[52] U.S. Cl. ...................... 524/317; 524/391; 525/123; 254/211.24
[58] Field of Search ............... 524/317, 391; 525/123; 264/211.24

[56] References Cited

U.S. PATENT DOCUMENTS 4,464,438 8/1984 Lu ........................................ 428/516
4,611,019 9/1986 Lutzmann ........................... 524/169

Primary Examiner—Maurice J. Welsh
Attorney, Agent, or Firm—Michael Leach; James C. Simmons; William F. Marsh

[57] ABSTRACT

An extruable polyvinyl alcohol composition useful for packaging and molding applications is prepared by melt blending polyvinyl alcohol and thermoplastic polyurethane to provide a product which has low water absorptivity, improved impact resistance, and improved low temperature/low humidity tensile properties. Useful extruded articles prepared from such compositions include films and bottles.

A method for extruding the polyvinyl alcohol composition comprises:
adding sufficient energy to the polyvinyl alcohol composition to both melt it and essentially eliminate the polyvinyl alcohol crystallinity in the melt, and
simultaneously removing energy from the melt at a rate sufficient to avoid decomposition of the polyvinyl alcohol.

The thermoplastic polyurethane may be added to the polyvinyl alcohol before the polyvinyl alcohol is melted and its crystallinity eliminated or blended with the thus treated polyvinyl alcohol and then melt extruding the polyvinyl alcohol/polyurethane blend.

41 Claims, No Drawings

EXTRUDABLE POLYVINYL ALCOHOL COMPOSITIONS CONTAINING THERMOPLASTIC POLYURETHANE

FIELD OF THE INVENTION

The present invention relates to melt extrudable blends of polyvinyl alcohol and polyurethane which have desirable physical properties.

BACKGROUND OF THE INVENTION

Polyvinyl alcohol (PVOH) is a water soluble, biodegradable resin with excellent aroma and oxygen barrier properties and resistance to most organic solvents. Other desirable attributes of PVOH include anti-static properties, grease and oil resistance and heat sealability. The polymer is used extensively in adhesives, textile sizing and paper coatings. However, the end uses of PVOH have been limited despite its excellent mechanical, physical and chemical properties to those uses in which it is supplied as a solution in water. This limitation is partly due to the fact that vinyl alcohol polymers in the unplasticized state have a high degree of crystallinity and show little or no thermoplasticity before the occurrence of decomposition which starts at about 170° and becomes pronounced at 200° C. below its crystalline melting point.

To a limited extent, this shortcoming has been overcome through the use of external or internal plasticizers. Regarding the use of external plasticizers, a common plasticizer for PVOH is blended into the polymer using a high intensity mixer and then the plasticized resin is fed into an extruder for melting and shaping of the formed article. Common external plasticizers include hydroxylic compounds, such as ethylene glycol, polyethylene glycol, neopentyl glycol, glycerine and non-hydroxylic compounds such as aromatic sulfonamides and aromatic phosphates as disclosed in U.S. Pat. No. 4,536,532.

Internal plasticization of PVOH is achieved with a comonomer through copolymerization, grafting or post reaction to breakup the crystallinity and to reduce the crystalline melt temperature below its decomposition temperature. For example, hydroxyethylation of PVOH is disclosed in U.S. Pat. Nos. 2,990,398; 1,971,662 and 2,844,570 and copolymers of PVOH and poly(alkyleneoxy) acrylates are disclosed in U.S. Pat. No. 4,618,648.

The desirable physical and mechanical properties of PVOH combined with thermoplasticity have opened a new market opportunity for PVOH, especially in packaging applications where the contents must be dissolved or dispersed in water. Examples of such packaging applications for these PVOH materials include pesticides which are applied as a water spray, caustic cleaners or detergents which are dissolved during use, and process chemicals such as pigments, dyes or carbon black which are dissolved or dispersed in water. The advantages of using a water soluble film for packaging the above materials include the following:

elimination of human exposure to highly toxic or concentrated chemicals;
improvement in measuring accuracy; and
elimination of the need to clean and discard toxic chemical containers after use.

While there are water soluble PVOH films available for packaging these materials, they typically have at least one of the following deficiencies:

Commercial PVOH films use low molecular weight PVOH for rapid cold water solubility. The low molecular weight makes the polymer undesirable for packaging one to ten pound quantities of pulverulent materials because the tensile strength, elongation and tear resistance are poor.

Low temperature impact strength is poor if 3 to 10% water is used as a coplasticizer, since water loses its plasticization effect below 0° C. causing the PVOH film packages to embrittle at low temperature. This limits the uses of PVOH film in cold climates.

The physical properties of this hygroscopic polymer such as tensile strength and elongation are dependent on atmospheric humidity. Therefore, it elongates and blocks at high humidity, whereas at low humidity it is a stiff and low enlongating film. This reduces the shelf stability of the film and could limit its end uses in dry environments.

U.S. Pat. No. 4,464,438 discloses a composition comprising three essential components, namely, PVOH, copoly(ethylene-vinyl alcohol) and a polymeric processing aid, such as a polyamide or polyurethane, and having excellent grease barrier properties.

U.S. Pat. No. 4,611,019 discloses a blend of selected polyamides or polyesters to plasticize melt extrudable PVOH for improved oxygen barrier properties.

SUMMARY OF THE INVENTION

The present invention provides a PVOH composition containing thermoplastic polyurethane (PUR), which composition is readily melt extrudable and provides extruded articles demonstrating improved impact resistance, low temperature flexibility and reduced water absorptivity. Also provided is a process for the production of such extrudable PVOH/PUR compositions in the form of essentially gel-free thermoplastic pellets useful for conventional thermoplastic processing.

The extrudable PVOH/PUR composition consists essentially of:

(a) 5 to 95 wt % PVOH,
(b) 5 to 95 wt % thermoplastic PUR, and
(c) 1 to 30 wt % plasticizer, based on polyvinyl alcohol.

The extrudable PVOH/PUR composition is obtained by providing sufficient energy to a PVOH which is at least partially crystalline to both melt the PVOH and substantially eliminate the crystallinity in the PVOH melt while simultaneously removing energy from the PVOH melt at a rate sufficient to avoid decomposition of the PVOH melt. The melt is then extruded, preferably into a strand, rapidly cooled and cut into pellets, mixed with the thermoplastic PUR and melt extruded for subsequent thermoprocessing into the desired product or article.

If the thermoplastic PUR is initially blended with a PVOH which is at least partially crystalline, a melt extrudable composition of this PVOH/PUR blend is obtained by providing sufficient energy to the PVOH/PUR blend both to melt the PVOH and the PUR and to substantially eliminate the PVOH crystallinity in the melt while simultaneously removing energy from the PVOH/PUR melt at a rate sufficient to avoid decomposition of the PVOH. The melt is then processed directly into the desired product or article, or extruded into a strand, rapidly cooled and cut into pellets for subsequent thermoprocessing.

The process affords a clear, essentially gel-free thermally stable PVOH/PUR composition having a maximum melt temperature (determined by Differential Scanning Colorimeter) which is at least 5° C. lower than that of unprocessed PVOH. The energy input utilized in the process is at least about 0.27 KW hr/kg. and desirably less than 0.6 KW hr/kg, preferably 0.3 to 0.45 KW hr/kg. (KW hr/kg=kilowatt hours/kilogram PVOH). By separating the melt compounding from the shaping operation one can obtain an extrudable PVOH/PUR pellet that subsequently can be shaped into films, sheets, articles, especially bottles, and the like that exhibit little polymer decomposition or gels, and show improved impact resistance, low temperature flexibility and reduced water absorptivity.

In contrast, the prior art only added enough energy to melt the PVOH avoiding excess energy which would lead to decomposition of the PVOH. The present invention adds the necessary energy to melt the PVOH and the PUR, if present, and adds additional energy to shear the areas of PVOH crystallinity, while at the same time removes this shearing energy to prevent the melt temperature from exceeding the decomposition temperature. That is to say, the additional energy added to effect the shearing essentially passes through the resin melt eliminating the crystallinity and is removed by simultaneously cooling the melt, for example via the cooling jacket of the extruder.

The extruder requires intensive mixing elements to provide the requisite shearing energy. The shearing energy generated in a particular zone of the extruder should not be greater than that which can be removed by cooling; otherwise decomposition results.

The PVOH/PUR pellets produced are thermally stable and can withstand subsequent melt processing in conventional thermoplastic processing equipment, for example, a single screw extruder. The pellets can be thermoplastically processed (extruded) into essentially gel-free articles without decomposition because the equipment only has to melt the pellets (PVOH crystallinity having been greatly reduced) and generate sufficient pressure for the desired forming operation. These operations include, by way of example, extrusion, injection molding, thermoforming, injection blow molding, and tubular film blowing, all well-known in the art.

The PVOH/PUR composition is especially suitable for the production of water soluble, high barrier containers such as bottles. These bottles can be produced by injection molding, injection blowing molding, or continuous blow molding, i.e. molding processes well-known in the art. Generally, conventional blow molding equipment can be used for the production of the bottles, although equipment with streamlined flow regions such as those used with heat sensitive materials is preferred.

In addition, the PVOH/PUR composition can be used as a layer or layers in combination with other polymeric layers in multi-layer films. For example, the PVOH/PUR blend can be co-extruded with one or more layers of polyolefin such as polyethylene. These multi-layer structures are suitable for packaging application. The manufacture of such multi-layer structures, in particular films, is well-known in the art.

DETAILED DESCRIPTION OF THE INVENTION

Suitable PVOH's for use in the preparation of the extrudable PVOH/PUR composition and thermoplastic pellets include PVOH which is 75-99+ mole % hydrolyzed, preferably 85-98+ mole % hydrolyzed, and possesses a degree of polymerization ($DP_n$) in the range of 200 to 2500, i.e., solution viscosities of 2 to 55 cps at 20° C. as a 4% aqueous solution. Copolymers of vinyl alcohol and methyl methacrylate consisting of 94-98 mole % vinyl alcohol and 2-6 wt % methyl methacrylate as disclosed in U.S. Pat. No. 3,689,469 are considered suitable equivalents to the vinyl alcohol and vinyl acetate copolymer containing the same mole% acetate units. The PVOH may also contain up to 3-4 mole % of a copolymerized monomer.

The PVOH component of the PVOH/PUR composition preferably comprises 50 to 95 wt %, most desirably 75 to 95 wt %.

The thermoplastic PUR's suitable for use in the present invention are based on the reaction of a polyisocyanate (aromatic or aliphatic) with polyester, polyether or polycaprolactone polyols. Chain extenders such as diols and diamines could possibly be used in the preparation of the PUR's. Such thermoplastic PUR's are available from B. F. Goodrich and Dow Chemical under the trademarks Estane ® and Pellethane ®, respectively. It is preferred to use about 5 to 50 wt % and most desirably 5 to 25 wt % of the thermoplastic PUR.

A plasticizer is used to improve the flow characteristics of the PVOH. The plasticizer should be compatible with the PVOH and may be a polyhydric alcohol, most preferably glycerol, polyethylene glycol or other hydrophilic compounds known in the art to possess compatibility with the PVOH. Other hydrophilic plasticizers useful in the invention include ethylene glycol, diethylene glycol, trimethylol propane, mannitol, pentaerythritol or other polyhydric low molecular weight alcohols, block copolymers of ethylene oxide and propylene oxide, non-hydroxylic plasticizers such as aromatic amides and aromatic sulfonamides, and others known to those skilled in the art. The preferred plasticizers are those that have multiple hydroxyl functionality, i.e. polyols. The amount of the plasticizer or blends of plasticizers added to the composition ranges from 1 to 30 wt %, preferably 3 to 20 wt %, and most preferably 5 to 15 wt %, based on PVOH.

The thermal stability of the PVOH can further be improved through the addition of small amounts of a mineral acid, preferably phosphoric acid, to a high intensity mixer in which PVOH and plasticizer may be blended prior to extrusion.

The PVOH should either be low in residual ash (sodium acetate measured as $Na_2O$) or treated with a neutralizing mineral acid.

The mineral acid used to neutralize the sodium acetate remaining from the neutralization of the hydrolysis catalyst may suitably be phosphoric acid, sulfuric acid, hydrochloric acid, sulfurous acid or any other strong acid yielding a pH neutral or slightly acidic salt.

The preferred phosphoric acid converts the remaining sodium acetate, which acts as a catalyst for decomposition of PVOH, to acetic acid and disodium monohydrogen phosphate and thus significantly reduces thermal decomposition. However, the phosphoric acid should be added in a specific ratio to sodium acetate or the phosphoric acid itself could contribute significantly to the decomposition. The ratio between moles of sodium acetate and added phosphoric acid is 2:1. Low ash PVOH, which is essentially free of sodium acetate by washing with methanol, in most instances will not need a neutralizing acid addition. Further, the formed acetic acid must be devolatilized during the extrusion operation in order to avoid acid-induced decomposition and foaming at the extruder outlet due to evaporating acetic acid.

Optionally, but advantageously, a dispersing agent such as glycerol mono-oleate (GMO) is added during the mixing operation. The dispersing agent greatly increases the rate of diffusion and thereby reduces the blending time needed to obtain a uniform blend of the plasticizer, PVOH, optionally PUR, and phosphoric acid; prevents the formations of lumps during the mixing operation which later can result in the formation of gels due to inadequate plasticizer or phosphoric acid content., and provides for a free flowing powder at all times, greatly facilitating the feeding of the extruder using conventional feeding equipment. The dispersing agent further acts as an internal lubricant preventing any significant buildup of polymer resin on the walls or in stagnant areas of the extruder. This significantly reduces the possibility of any PVOH experiencing prolonged residence times leading to the degradation of the PVOH and the formation of gels.

The dispersing agent suitably used is a mono- or diester of glycerol and a $C_6$-$C_{18}$ fatty acid. Fatty esters resulting from the esterification of a $C_6$-$C_{18}$ fatty acid and a low molecular weight polyhydric compound are contemplated as functional equivalents. The fatty esters act as surfactants. Obviously, other dispersing agents may also be used.

The preferred range of glycerol mono-oleate or other dispersing agents added during the high intensity mixing is 0.05 wt % to 1.0 wt %, or more preferred 0.1 to 0.5 wt %.

In addition, it will be understood that various additives such as fillers, pigments, stabilizers, other thermoplastic resins and the like may be added to the PVOH/PUR composition of this invention without departing from its scope.

U.S. patent application Ser. No. 07/402,167, filed 1 Sept. 1989, which teaches a method for making extrudable PVOH compositions, is hereby incorporated by reference.

In the following description of the process for making a melt extrudable PVOH/PUR composition according to the invention, it will be understood that any reference to PVOH in preparing melt extrudable PVOH pellets for melt blending with the thermoplastic PUR would also apply to the direct preparation of the melt extrudable PVOH/PUR blend.

The PVOH/PUR compositions are prepared either by melt blending a PVOH composition containing plasticizer with a thermoplastic PUR in a high intensity extruder or by first preparing pellets of the plasticized PVOH blend in a suitable high intensity extruder, and then melt blending with the PUR. preferably in a single screw extruder, to make pellets of the PVOH/PUR composition which then may be converted to the desired extruded article by an appropriate extruder.

The extruder used in the melt compounding of the PVOH, plasticizer, and optionally PUR. must be able to provide an energy input of at least about 0.27 KW hr/kg, preferably 0.35-0.45 Kw hr/kg, to the PVOH. The energy required to melt process the PUR from ambient temperature to the forming temperature is typically less than 0.2 KW hr/kg. Since this amount is much less than the energy requirements per kg of PVOH, minimal changes in the process conditions for PVOH are necessary. The energy input for melting the PVOH (and PUR) may be heat or mechanical energy but with most suitable extruders will be all mechanical energy as will be the shearing energy.

The upper, practical limit of energy input would be about 0.6 KW hr/kg because any energy beyond that necessary to melt the PVOH (and PUR if present) and to eliminate PVOH crystallinity must be removed as "waste energy". The more energy that passes through the PVOH and has to be removed the more inefficient the process. Approximately 0.1 to 0.15 KW hr/kg is required to melt (and heat( the PVOH and about 0.2 to 0.3 KW hr/kg is needed to shear the crystalline areas in the melt.

Further, the extruder must be capable of removing the excess energy input not required in the heating, melting and shearing of the PVOH resin. The excess energy is removed through the extruder barrel, extruder screw, or through the evaporation of plasticizer during the devolatilization step. Examples of suitable commercially available extruders include twin screw extruders and kneader-extruders such as the Buss kneaders.

The melt compounding extruder is operated at a high rotational screw speed with a number of intensive kneading elements in the screw design in order to generate the required energy input. Additionally, the screw barrels are operated at a temperature lower than the melt temperature of the polymer such that there is a net transfer of heat out of the extruder. The result is a high degree of mechanical energy input into the polymer that is sufficient to eliminate gels or crystalline portions of the polymer melt by shearing apart any crystalline areas. A short residence time in the extruder to reduce the heat history results in a strand of molten PVOH at the extruder exit that is essentially gel-free and clear, i.e. the shorter the time in the extruder the more clear and color-free the product. Quick quenching of the strand further reduces the heat history and improves the resulting color of the polymer pellet.

A preferred commercially available apparatus is the Werner and Pfleiderer twin screw extruder which is a co-rotating fully intermeshing extruder. The screw is designed in a segmented fashion so that a variety of different screw elements can be placed on keyed shafts to achieve the desired degree of mixing for a particular application. Screw elements can vary along the length of the screw, but the two screws must be matched to achieve fully intermeshing surfaces. Generally speaking there are two different types of elements, screw conveying elements and kneading or mixing disks. The screw elements can have either a forward or reverse pitch, while the kneading disks can have a neutral pitch in addition to the forward or reverse pitch. The kneading disks consist of staggered elliptical disks that are offset to achieve an overall conveying pitch. The disks can vary in width from one element to another but are typically of uniform width within an element. In addition to a varied pitch in the kneading blocks, different screw elements can have different conveying pitches. The worker skilled in the art would be able to assemble an appropriate screw to achieve the optimum shear history and conveying efficiency to result in the desired final product.

As can be expected, all of the elements impart different levels of shear history and conveying ability. These can be summarized in the following list of elements and their relative shear intensity.

Greatest Shear—Least Forward Conveying Efficiency
  reverse pitch screw elements
  reverse pitch kneading blocks
  neutral kneading blocks
  forward pitch kneading blocks
  forward pitch screw elements
Least Shear—Most Forward Conveying Efficiency In addition, the wider the kneading disk, the more shear is imparted to the melt. Also the tighter the pitch, the more shear is imparted. All of these factors can be combined by a worker skilled in the art to design a screw to achieve the maximum shear input without thermally degrading the product.

The first step in a preferred method for making extrudable PVOH/PUR compositions involves the preparation of PVOH blended with a dispersing agent to produce a granular, free flowing mixture to be fed into a melt compounding extruder. The blend is prepared using a variable speed high intensity mixer equipped with a cooling jacket. PVOH is charged to the mixer and the temperature is allowed to rise to approximately 55° C. before the glycerol mono-oleate is added to the mixing vessel. Next the liquid plasticizer (glycerol) is injected into the mixing chamber under pressure through a spray nozzle once 70° C. is reached. The nozzle serves to atomize the plasticizer and eliminates lumping of the PVOH. During the addition of the plasticizer, both the cooling jacket temperature and the mixer speed are adjusted to maintain the temperature of the mix below 105° C., preferably near 95° C. Advantageously, the required amount of mineral acid, preferably phosphoric acid, is mixed with the plasticizer in a liquid blend.

Other solid or liquid additives, pigments, fillers or stabilizers can be added once the plasticizer addition is complete. The mixing action is continued until a free flowing homogeneous product is achieved. This is generally 4–10 minutes but can vary depending upon the addition rate of the glycerol and the Tg of the PVOH polymer. After a free flowing mix is produced, it is discharged into a cooling blender and the temperature reduced to 30° C. The product is ready for extrusion compounding.

Rather than performing a premixing step, it is more desirable to directly inject the plasticizer (glycerol), mineral acid ($H_3PO_4$) and dispersing agent (glycerol mono-oleate) into the extruder at about the 3 diameter distance downstream from the feed location using the first diameters to heat up the PVOH. Thus, the additives are blended into the PVOH which is then quickly melted, sheared and extruded, avoiding a more prolonged exposure to high heat in a premixer.

The preferred extruder is capable of achieving a high level of mechanical energy input, uniformly distributed throughout the polymer. The mechanical energy input of the screw extruder can be quantified by measuring the specific energy. The specific energy input of a screw extruder is computed from the ratio of the electrical energy, in kilowatts (KW), of the screw mechanical drive to the throughput rate of the polymer (kg/hr). The preferred specific, or mechanical, energy input for the preparation of a homogeneous PVOH melt is greater than about 0.30 KW hr/kg. The extruder must also have cooling capabilities, most preferably jacketing in the barrel sections for heat transfer oil or water. The preferred temperature profile of the PVOH obtained in the different extruder zones is 150–230° C. depending upon the grade of PVOH, most preferred 170–220° C. Temperatures less than this result in the appearance of unmelted particles in the strands from the extruder outlet, while temperatures above this range increase the number of gels in the strand and promote degradation of the polymer at the barrel walls.

Finally, the extruder must be capable of removing residual moisture and other residual reaction by-products to prevent foaming of the product at the extruder outlet. The level of vacuum applied at the devolatilization zone of the extruder can range from 760 to 10 torr depending upon the level of moisture and generated acetic acid in the feed polymer and plasticizer.

The pre-blended PVOH resin containing plasticizer and any additives is fed either volumetrically or gravimetrically into the feed throat of the screw extruder. The feed area is cooled to prevent premature melting of the polymer in the feed throat. The product is transported into the working zone of the extruder where a melt is generated and sheared by using either mixing pins, kneading blocks, or flight interruptions. Once a melt or fluxed state is achieved, the material is conveyed under the devolatilization section of the extruder.

The remaining section of the screw is used to finish the homogenization of the product by shearing to remove any gels or remaining crystalline o material. The material is pressurized by either a conveying section of a screw extruder or a positive displacement gear pump through a single or multiple hole die. The exiting strands are cooled as rapidly as possible to prevent polymer degradation. The strands can be passed over chilled, chrome plated or stainless steel rotating rolls, directed onto a moving chilled belt, or passed through a bath of liquid nitrogen. Once the strands are cooled, they are cut in conventional plastic pelletizers to pellets suitable for melt extrusion mixing with the thermoplastic PUR.

The PVOH pellets are blended with the PUR by conventional dry blending methods such as drum tumbling or ribbon blenders.

The PVOH/PUR product according to the invention is essentially gel-free, i.e., less than 20 gels/24in$^2$, preferably <15 gels/24in$^2$ and most desirably <10 gels/24in$^2$ as determined by the following test method: A 2 mil thick monolayer film is produced from a given sample of the PVOH/PUR pellets using a 24 L/D single screw extruder and an 8-inch coathanger cast film die. A 4-inch by 6-inch area is marked off within the center portion of the film and the gels content is evaluated by optical image analysis using a LeMont Scientific OA-SYS. Single film thickness is backlit, and image acquired at a working magnification of 2.2×. Five random areas, 33×44 mm, were evaluated for each sheet, for a total analysis area of 72.6 cm$^2$. Individual frames area digitized into 512×480 pixel array with 256 grey levels. Image contrast is enhanced and gels delineated through thresholding. Gels are then counted and measured, and statistical analyses performed using standard software. The final number is given as gels/24 sq. in.

The processed PVOH/PUR also possesses a maximum melt temperature as determined by DSC that has been reduced by at least about 5° C., preferably at least about 10° C., especially for 98–99+ mole % hydrolyzed PVOH and at least about 15° C. especially for 87–89 mole % hydrolyzed PVOH.

The PVOH/PUR compositions of the present invention in the following examples were prepared either by melt blending a PVOH composition containing plasticizer and phosphoric acid with PUR in a 46 mm reciprocating, rotating Buss kneader or by first preparing pellets of the melt extrudable PVOH blend containing the plasticizer and phosphoric acid in a suitable extruder and then melt blending with the PUR in a single screw extruder. The pellets of the PVOH/PUR composition were then converted to a single layer film by a single screw extruder equipped with a coathanger flat die having a 5.08 cm flat slit with a 20 mil gap. The temperatures along the barrel varied from 175° to 215° C. The extruded films were clear and nearly gel-free. These films were then tested for various physical and mechanical properties.

Tensile Properties: The film tensile was measured according or similar to ASTM test method D 882-83. The film was either conditioned for 24 hr at 50% relative humidity ( RH( and 75° F. ( 24° C.) or placed in an oven at 110° F. (43° C.) and 30% RH before tensile measurement.

Moisture Absorption: The pellets were pressed into a film with a thickness ranging from 5 to 10 mils. The film was then cut into a 2×3 inch (50.8×76.2 mm) rectangle and placed into a vacuum oven at 100° C. for 24 hr to remove the residual moisture. An initial weight was recorded and then samples were placed in different humidity chambers and the weight gain was monitored.

In the following examples all parts are parts by weight.

EXAMPLE 1

88.4 parts of 87-89 mole % hydrolyzed PVOH (Airvol 205; DPn=550) with an ash content of about 0.45% was introduced into a high intensity Henschel 150L mixer and the mixer started at 900 rpm. When the material temperature reached 65° C., 1 part of liquid glycerol mono-oleate (GMO; 40° C.) was added as a processing aid to the mixer. After the addition of the GMO was completed (about 1 min( a liquid mixture consisting of 10 parts glycerol and 0.68 parts 85% phosphoric acid was added while simultaneously reducing the mixer speed to 450 rpm. Cooling water was introduced to the mixer jacket and controlled to maintain the product temperature below 100° C. at all times. After the glycerol addition was completed, the PVOH blend was mixed for 5 minutes until a free flowing blend was formed. The blend was then discharged into a low intensity cooling mixer and the product temperature was lowered to 40° C.

This PVOH blend and Estane 58277 PUR were loaded into two volumetric feeders and fed into a 46 mm reciprocating, rotating Buss kneader extruder. The two components were introduced at 90 parts PVOH blend and 10 parts PUR. The extruder length was 11 L/D with the feed port located at 0 L/D and an opening in the barrel was provided at the 4 L/D location for vacuum devolatilization of residual water and other organics. The extruder was hot oil heated (cooled) in two sections with heating (cooling) also possible through the screw shaft. The discharge of the extruder was equipped with a positive displacement gear pump to minimize the pulsations in the melt stream generated by the reciprocating action of the screw shaft. The process settings for the extruder were as follows:

TABLE 1

| Zone 1 (screw) | 110° C. |
| Zone 2 | 100° C. |
| Zone 3 | 165° C. |

TABLE 1-continued

| Zone 4 (pump) | 185° C. |
| Die | 170° C. |
| Screw Speed | 310 rpm |
| Feed Rate | 22.7 kg/hr |
| Specific Energy Input | 0.35 KW hr/kg |

Strands exited the extruder and were cooled by contacting with water cooled chill rolls. Once the strands were sufficiently cooled, they were diced on a pelletizer into ⅛ inch (3.2 mm) pellets. The strands and pellets were smooth with a clear to slight haze. The melt flow of the resulting pellets at 190° C. with a 10.1 kg weight was 13.4 g/10 min.

EXAMPLE 2

This example demonstrates the ability to produce PVOH/PUR blends with different properties by simply changing the feed ratio of the two components. Ninety parts of Airvol 205 PVOH with an ash content of about 0.45% was introduced into a high intensity Henschel 400L mixer, and the mixer was started at 900 rpm. When the material temperature reached 65° C., 0.5 parts of liquid GMO (40° C.) were added. After the addition of the GMO was completed ( about 1 minute) a liquid mixture consisting of 9.5 parts of glycerol and 0.7 parts of 85% phosphoric acid was added to the PVOH mixture while simultaneously reducing the mixer speed to 450 rpm. Cooling water was introduced at the mixer jacket and controlled to maintain the product temperature below 100° C. at all times. After the glycerol addition was completed, the resulting PVOH blend was mixed for 5 minutes until a free flowing blend was formed. The blend was then discharged into a 1200L Littleford low intensity cooling mixer and the product temperature lowered to 40° C.

This PVOH blend composition and Estane 58277 PUR were loaded into two volumetric feeders and fed into a 46 mm reciprocating, rotating Buss kneader extruder. The feed ratio of the two components were varied to produce products with different properties using the same processing equipment.

The extruder was essentially identical to the extruder described in Example 1, except an additional opening in the screw barrel was uncovered to allow for downstream addition of the PUR to the molten PVOH blend. In addition, a provision was made to directly inject additional glycerol to control the viscosity of the final product. The PVOH blend was metered into the feed port located at 0 L/D and the PUR was fed into the 4 L/D opening. Vacuum volatilization was accomplished at the 7 L/D location. The process settings for the extruder were as follows:

TABLE 2

|  | Composition 1 | Composition 2 |
| --- | --- | --- |
| Zone 1 (screw) | 140° C. | 165° C. |
| Zone 2 | 180° C. | 195° C. |
| Zone 3 | 140° C. | 145° C. |
| Zone 4 (pump) | 185° C. | 195° C. |
| Die | 190° C. | 195° C. |
| Screw Speed | 314 rpm | 300 rpm |
| Feed Rate | 29.5 kg/hr | 24.5 kg/hr |
| Specific Energy Input | 0.29 KW hr/kg | 0.273 KW hr/kg |
| Composition |  |  |
| % PVOH | 75 | 85 |
| % PUR | 25 | 14 |
| % TiO$_2$ | — | 1 |

TABLE 2-continued

|  | Composition 1 | Composition 2 |
|---|---|---|
| Melt Flow* | 2.3 g/10 min | 2.7 g/10 min |

*190° C. with 10.1 kg weight

The strands exited the extruder and were cooled by contacting with water cooled chill rolls. Once the strands were sufficiently cooled, they were diced on a pelletizer into ⅛ inch ( 3.2 mm( pellets. The strands and pellets were smooth with the strand containing titanium dioxide being white.

EXAMPLE 3

This example shows the preparation of melt extrudable PVOH pellets identified in the following examples as Vinex TM PVOH resin in which it is melt blended with thermoplastic PUR.

Ninety parts of Airvol 205 PVOH with an ash content of about 0.45% was introduced into a high intensity Littleford 180L mixer and the mixer started at 900 rpm. When the material temperature reached 65° C. a liquid mixture consisting of 9.0 parts of glycerol and 0.62 parts of 85% phosphoric acid was added to the mixture while simultaneously reducing the mixer speed to 450 rpm. Cooling water was added to the mixer jacket and controlled to maintain the product temperature below 100° C. at all times. After the glycerol addition was completed, the PVOH blend was mixed for five minutes until a free flowing blend was formed. The blend was then discharged into a Littleford 400L cooling mixer and the product temperature lowered to 40° C. The resulting mixture was free flowing and free of clumps or degraded material.

This blended PVOH composition was loaded into a volumetric feeder and fed into a 46 mm reciprocating, rotating Buss extruder. The screw was designed to achieve a high degree of mechanical energy input without product degradation. The extruder was a devolatilizing extruder, and a vacuum of 254 torr (10 in Hg) was applied at the vent port located at 7 diameters to remove any residual moisture in the polymer and acetic acid formed from the conversion of sodium acetate to disodium monohydrogen phosphate. The melt temperature of the polymer in the working zone of the extruder was maintained at the upper end of the polymer melting curve as indicated by a Differential Scanning Calorimeter ( DSC(. Melt temperatures were measured at 183° C., 197° C. and 199° C. Typical operating conditions are listed in Table 3 below.

The product exited the extruder and was immediately cooled below its glass transition temperature to prevent product degradation and crystallization of the polymer that would lead to gel formation during subsequent thermoforming operations. The strands were cut in a conventional manner into pellets and collected.

TABLE 3

| Screw Speed | 300 RPM |
|---|---|
| Screw Temperature | 140° C. |
| Barrel Temperatures | |
| 1st zone | 150° C. |
| 2nd zone | 150° C. |
| Production Rate | 21.7 kg/hr |
| Max. Melt Temp. | 201° C. |
| Screw Power | 6.5 KW |
| Specific Energy Input | 0.30 KW hr/kg |

The pellets produced were gel-free, smooth and had a straw color. Extrusion cast films from these pellets were clear and gel free (<10 gels/24 in²).

EXAMPLE 4

Various proportions of Vinex TM 2025 PVOH resin prepared as in Example 3 and Pellethane 2355-85ABR PUR were evaluated. The PVOH resin consisted of 90% Airvol 205 PVOH, 10% glycerol and 0.1% GMO. Pellets of the PVOH resin and pellets of the Pellethane PUR were dry blended by hand and then added to a 1 inch (25.4 mm) Killion single screw extruder and pelletized. These pellets were injection molded into tensile bars and heat deflection bars. A notched Izod test was performed on the heat deflection bars according or similar to ASTM D-256. The impact strength results at 110° F. (43° C.)/30% RH are shown in Table 4.

TABLE 4

| Run | % Vinex 2025 | % Pellethane | Impact Strength (ft lb/in) |
|---|---|---|---|
| 1 | 100 | 0 | 0.59 |
| 2 | 95 | 5 | 2.6 |
| 3 | 85 | 15 | 3.9 |
| 4 | 80 | 20 | — |
| 5 | 75 | 25 | — |
| 6 | 50 | 50 | 12 |

The data shows that the impact strength is significantly improved by the incorporation of thermoplastic PUR into the PVOH composition. Containers such as bottles are desirable applications for the PVOH/PUR blends.

EXAMPLE 5

PVOH/PUR compositions containing varying amounts of Vinex 2025 PVOH resin and Estane PUR were blended and extruded into strands in a one inch (25.5 mm) Killion single screw extruder (24 L/D). Strands from the various runs were then extrusion cast into films using a ¾ inch (19 mm) Killion single screw extruder (24 L/D) and an 8 inch (203 mm) coathanger die. The film thickness for the various runs averaged 2.2 mils. These films were then tested for moisture absorption, high temperature/low humidity elongation, and tensile strength. Table 5 summarizes the results of the tests.

TABLE 5

| | | | Wt. % Water Absorbed | Elongation | | Tensile psi |
|---|---|---|---|---|---|---|
| Run | PVOH | PUR | 23° C./ 75% RH | 100° F./ 30% RH | 75° F./ 50% RH | 40° F./ 10% RH |
| 7 | 100 | — | 21 | 20 | 250 | 1100 |
| 8 | 95 | 5 | 19 | 40 | 300 | 1600 |
| 9 | 90 | 10 | 17 | 150 | 300 | 1800 |
| 10 | 85 | 15 | 15.5 | 195 | 350 | 2100 |
| 11 | 80 | 20 | 14 | 260 | 375 | — |
| 12 | 75 | 25 | 13 | 260 | — | 2600 |
| 13 | — | 100 | 1 | — | — | — |

The data in Table 5 shows that by blending PUR with extrudable PVOH, not only was the the moisture absorptivity reduced, but the low temperature tensile properties were improved. Thus the extrudable PVOH/PUR composition affords a film useable at low temperatures.

STATEMENT OF INDUSTRIAL APPLICATION

The present invention provides an extrudable polyvinyl alcohol/polyurethane composition useful for packaging and molding applications.

We claim:

1. A melt extrudable composition consisting essentially of
    (a) 5-95 wt % melt extrudable polyvinyl alcohol which has been made melt extrudable by adding sufficient energy to the polyvinyl alcohol to both melt it and substantially eliminate the crystallinity in the melt while simultaneously removing energy from the melt at a rate sufficient to avoid decomposition of the polyvinyl alcohol,
    (b) 5-95 wt % thermoplastic polyurethane, and
    (c) 1-30 wt % plasticizer, based on polyvinyl alcohol.

2. The composition of claim 1 in which at least 0.27 KW hr/kg of energy is added.

3. The composition of claim 1 in which about 0.3 to 0.6 KW hr/kg of energy is added.

4. The composition of claim 1 in which about 0.35 to 0.45 KW hr/kg of energy is added.

5. The composition of claim 1 in which the polyvinyl alcohol is 85-99+ mole % hydrolyzed.

6. The composition of claim 1 in which the plasticizer is glycerol.

7. The composition of claim 1 in which the polyvinyl alcohol is mixed with a dispersing agent.

8. The composition of claim 7 in which the dispersing agent is glycerol mono-oleate.

9. The composition of claim 1 in which the polyurethane is the reaction product of a polyisocyanate with a polyester, polyether or polycaprolactone polyol.

10. A melt extrudable composition consisting essentially of
    (a) 50-95 wt % melt extrudable 75 to 99+ mole % hydrolyzed polyvinyl alcohol which has been eade melt extrudable by adding about 0.3 to 0.6 KW hr/kg to the polyvinyl alcohol to both melt it and substantially eliminate the crystallinity in the melt while simultaneously removing energy from the melt at a rate sufficient to avoid decomposition of the polyvinyl alcohol,
    (b) 5-50 wt % thermoplastic polyurethane, and
    (c) 3-20 wt % plasticizer, based on polyvinyl alcohol.

11. The composition of claim 10 in which about 0.35 to 0.45 KW hr/kg is added.

12. The composition of claim 10 in which the polyvinyl alcohol is 85-98+ mole % hydrolyzed.

13. The composition of claim 10 in which the plasticizer is glycerol.

14. The composition of claim 10 in which the polyvinyl alcohol is mixed with a dispersing agent.

15. The composition of claim 14 in which the dispersing agent is glycerol mono-oleate.

16. The composition of claim 10 in which the polyurethane is the reaction product of a polyisocyanate with a polyester, polyether or polycaprolactone polyol.

17. A melt extrudable composition consisting essentially of
    (a) 75-95 wt % melt extrudable 85 to 98+ mole % hydrolyzed polyvinyl alcohol which has been made melt extrudable by adding about 0.35 to 0.45 KW hr/kg to the polyvinyl alcohol to both melt it and substantially eliminate the crystallinity in the melt while simultaneously removing energy from the melt at a rate sufficient to avoid decomposition of the polyvinyl alcohol,
    (b) 5-25 wt % thermoplastic polyurethane, and
    (c) 5-15 wt % plasticizer, based on polyvinyl alcohol.

18. The composition of claim 17 in which the plasticizer is glycerol.

19. The composition of claim 18 in which the polyvinyl alcohol is mixed with a dispersing agent.

20. The composition of claim 19 in which the dispersing agent is glycerol mono-oleate.

21. The composition of claim 20 in which the polyurethane is the reaction product of a polyisocyanate with a polyester, polyether or polycaprolactone polyol.

22. A method for making an extruded article which comprises
    (a) adding sufficient energy to a blend of a plasticizer and a polyvinyl alcohol which is at least partially crystalline to both melt the polyvinyl alcohol and substantially eliminate the polyvinyl alcohol crystallinity in the melt,
    (b) simultaneously removing energy from the melt at a rate sufficient to avoid decomposition of the polyvinyl alcohol, and
    (c) adding a thermoplastic polyurethane to the polyvinyl alcohol/plasticizer blend, and
    (d) extruding the mixture to form an article.

23. The method of claim 22 in which the polyurethane is added to the polyvinyl alcohol/plasticizer blend prior to step (a).

24. The method of claim 22 in which at least 0.27 KW hr/kg of specific energy is added to the polyvinyl alcohol/plasticizer blend.

25. The method of claim 22 in which about 0.3 to 0.6 KW hr/kg of specific energy is added to the polyvinyl alcohol/plasticizer blend.

26. The method of claim 22 in which about 0.35 to 0.45 KW hr/kg of specific energy is added to the polyvinyl alcohol/plasticizer blend.

27. The method of claim 22 in which the polyvinyl alcohol is 85-99+ mole % hydrolyzed.

28. The method of claim 27 in which the plasticizer is glycerol.

29. The method of claim 22 in which the polyvinyl alcohol is mixed with a dispersing agent.

30. The method of claim 29 in which the dispersing agent is glycerol mono-oleate.

31. The method of claim 22 in which the polyurethane is the reaction product of a polyisocyanate With a polyester, polyether or polycaprolactone polyol.

32. An article made according to claim 22 which is a pellet, film, or bottle.

33. A method for making an extruded article which comprises
    (a) adding 0.27 to 0.6 KW hr/kg to a blend of a plasticizer and a 85-99+ mole % hydrolyzed polyvinyl alcohol which is at least partially crystalline to both melt the polyvinyl alcohol and substantially eliminate the polyvinyl alcohol crystallinity in the melt,
    (b) simultaneously removing energy from the melt at a rate sufficient to avoid decomposition of the polyvinyl alcohol,
    (c) adding a thermoplastic polyurethane to the polyvinyl alcohol/plasticizer blend, and
    (d) extruding the mixture to form an article.

34. The method of claim 33 in which about 0.35 to 0.45 KW hr/kg is added to the polyvinyl alcohol/plasticizer blend.

35. The method of claim 34 in which the plasticizer is glycerol.

36. The method of claim 35 in which the polyvinyl alcohol is mixed with a dispersing agent.

37. The method of claim 36 in which the dispersing agent is glycerol mono-oleate.

38. The method of claim 37 in which the polyurethane is the reaction product of a polyisocyanate with a polyester, polyether or polycaprolactone polyol.

39. An article made according to claim 33 which is a pellet, film, or bottle.

40. An article made according to claim 38 which is a pellet, film, or bottle.

41. A bottle blow molded from a composition consisting essentially of
(a) 5-95 wt % melt extrudable polyvinyl alcohol which has been made melt extrudable by adding sufficient energy to the polyvinyl alcohol to both melt it and substantially eliminate the crystallinity in the melt while simultaneously removing energy from the melt at a rate sufficient to avoid decomposition of the polyvinyl alcohol,
(b) 5-95 wt % thermoplastic polyurethane, and
(c) 1-30 wt % plasticizer, based on polyvinyl alcohol.

* * * * *